Patented Aug. 27, 1946

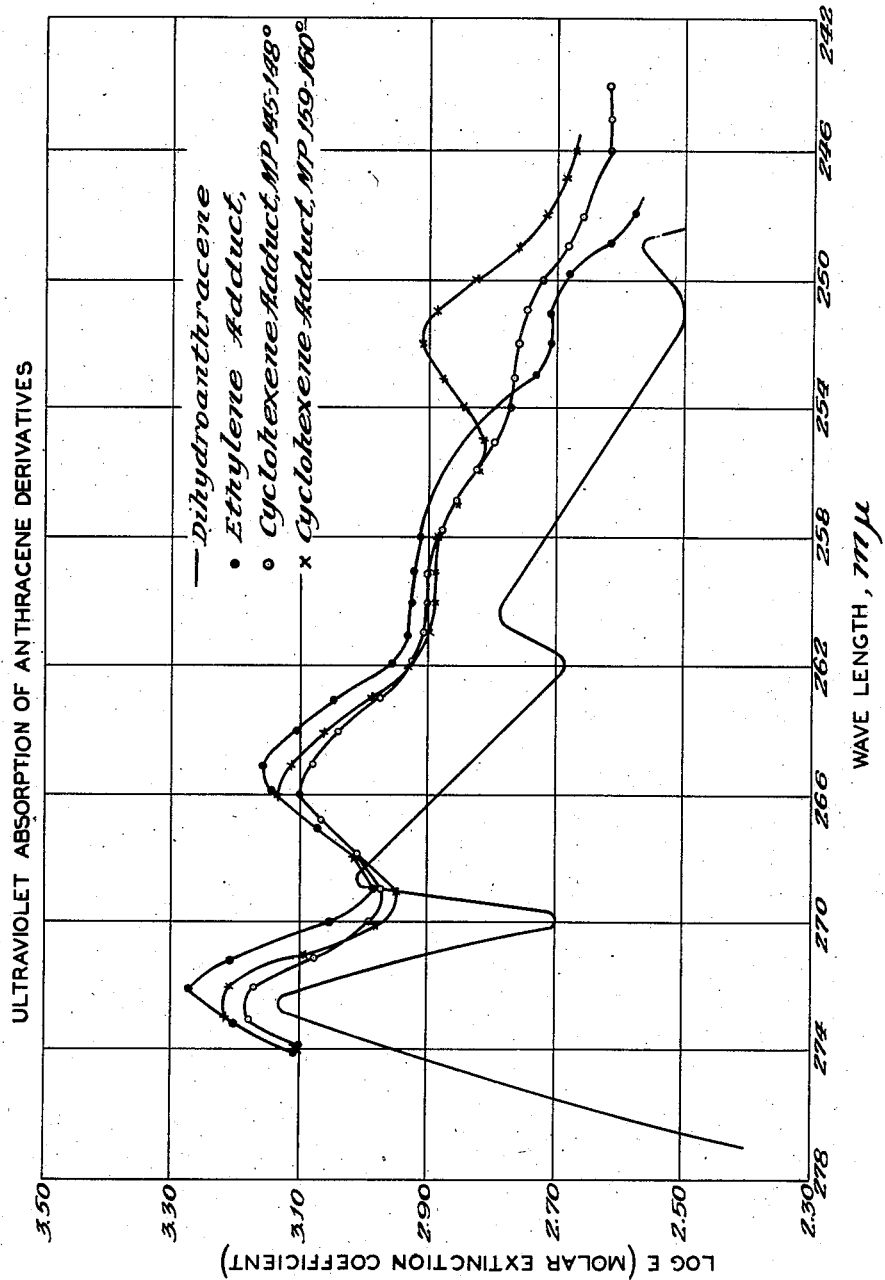

2,406,645

UNITED STATES PATENT OFFICE 2,406,645

SYNTHESIS OF AROMATIC COMPOUNDS

Charles L. Thomas, Riverside, Ill., assignor to Universal Oil Products Company, Chicago, Ill., a corporation of Delaware Application September 28, 1944, Serial No. 556,263

14 Claims. (Cl. 260—671)

This invention relates to the treatment of polynuclear aromatic compounds containing a conjugated diene structure in a Diels-Alder type reaction.

More particularly the present invention is directed to the reaction of polynuclear aromatic compounds comprising anthracene and substitution products thereof with an unsaturated hydrocarbon.

The typical Diels-Alder reaction or diene synthesis, as it is also known, involves the 1,4 addition of a system of conjugated double bonds to a compound known as a dienophile and containing an "activated" group of the type: C=C—C=O or C≡C—C=O. Although the dienophile is especially active when the carbonyl group is present, the reaction will also occur if other substituent groups replace or augment the carbonyl group in the dienophilic compound. These substituent groups include acetoxyl, nitro, sulfonyl, cyano, amino, etc. The present invention deals with the reaction between polynuclear aromatics and substitution products thereof, with unsaturated hydrocarbons in the absence of such activating groups.

Broadly, the present invention relates to a process which comprises thermally, non-catalytically reacting an unsaturated hydrocarbon and a polynuclear aromatic compound containing a conjugated diene structure and capable of forming a bridge between the carbon atoms in the 1,4 positions of the diene part of the molecule.

In one embodiment this invention relates to a process which comprises thermally, non-catalytically reacting an anthracene compound containing a conjugated diene structure with an aliphatic olefin at a temperature within the range of about 100 to about 300° C.

In another embodiment my invention relates to a process which comprises thermally, non-catalytically reacting an anthracene compound containing a conjugated diene structure with a cyclic olefin at a temperature within the range of about 100 to about 300° C.

The reactions of my invention may be illustrated by the following equations which show the compositions formed when anthracene is reacted with an aliphatic olefin and a cyclo-olefin, respectively.

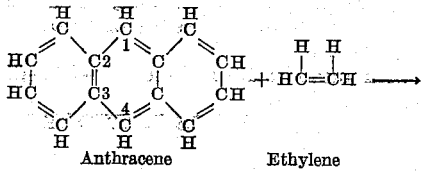
Anthracene    Ethylene

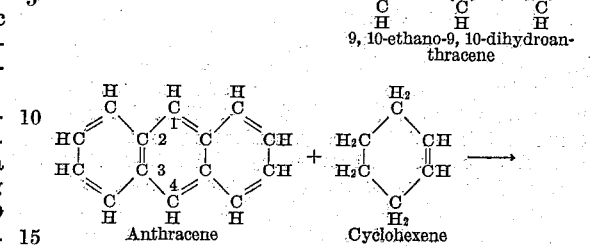
9,10-ethano-9,10-dihydroanthracene

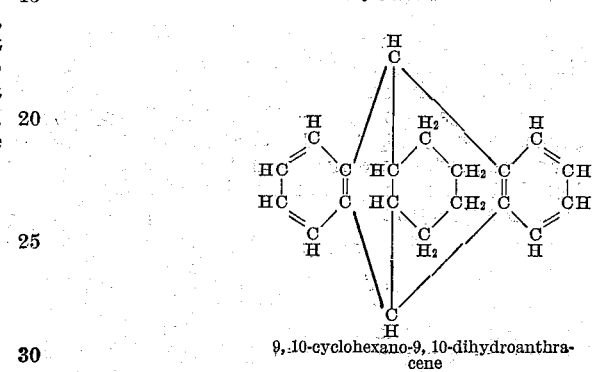
9,10-cyclohexano-9,10-dihydroanthracene

The polycyclic aromatic hydrocarbons which are suitable for the present process include, in addition to anthracene, benzanthracenes, tetracene, pentacene, hexacene, dibenzanthracenes, chrysene, cholanthrene, naphthacene and their substitution products including alkyl, alkoxyl, hydroxyl, amino, halogen and nitro derivatives. (All of these contain one or more conjugated dienic structures.) Anthraquinone and 9,10-dihydroanthracene derivatives are not substituted anthracenes and are not included in this group which comprises only polynuclear aromatics containing a conjugated diene structure.

The unsaturated compounds which are reacted with the anthracene hydrocarbons comprise mono-olefins, such as ethylene, propylene, 1- and 2-butylenes, isobutylene and the like, either alone, admixed or mixed in non-reactive substances. Diolefin hydrocarbons which may be used include allene, butadiene, piperylene, isoprene, diallyl, etc. Cyclo-olefins such as cyclopentene, cyclohexene, cycloheptene, etc., and the corresponding cyclodienes are also suitable for the process. Acetylenic compounds comprising either aliphatic hydrocarbons or aromatic hydrocarbons having acetylenic side chains may also be used.

No catalyst is employed in this reaction which takes place at temperatures from about 100° to about 300° C. The reaction can be effected in the presence or absence of a solvent and can take place in a batch type operation, as for example in an autoclave, or in a continuous manner by conducting the reactants through the reaction zone. Pressures below 2000 pounds per square inch are generally satisfactory.

The following examples illustrate the reaction comprising my invention but should not be construed as unduly limiting the invention in accordance therewith.

*Example I*

100 grams of anthracene was placed in an autoclave and the vessel closed. Ethylene was added to a pressure of 50 atmospheres and the temperature raised to 200° C. Ethylene was slowly absorbed. Upon cooling and opening the autoclave, a somewhat impure product was removed which melted at 140° to 141° C. Unreacted anthracene was also found to be present. 130 grams of toluene was added as a solvent and the autoclave again closed, pressured to 50 atmospheres with ethylene and heated to 200° C. Again ethylene was absorbed. The reaction product was removed from the bomb and crystallized from the toluene followed by recrystallization from alcohol. The product which comprised 9,10-ethano-9,10-dihydroanthracene was in the form of white needle-like crystals which melted at 142° to 153° C. and which boiled at atmospheric pressure without noticeable decomposition. An analysis of the anthracene-ethylene reaction product showed that it comprised 93.12% carbon and 6.71% hydrogen, while the calculated percentages of carbon and hydrogen for 9,10-ethano-9,10-dihydroanthracene were 93.20 and 6.8 respectively. The reaction product did not form a picrate, indicating that it no longer contained the normal anthracene structure.

*Example II*

100 grams of anthracene was placed in a reaction vessel to which was added 1000 cc. of cyclohexene. The mixture was heated to 250° C. for eight hours. A solid product was formed which was recrystallized to remove unreacted anthracene. Two isomers of 9,10-cyclohexano-9,10-dihydroanthracene, one melting at 145–149° C. and the other at 159–160° C. were found on analysis to comprise carbon and hydrogen as follows: (1) 92.51% carbon and 7.42% hydrogen and (2) 92.39% carbon and 7.59% hydrogen. The calculated values for the reaction product were 92.31% carbon and 7.6% hydrogen.

*Example III*

Ultraviolet absorption spectra for the ethylene adduct and for the cyclohexene-anthracene reaction products, the latter prepared according to the procedure of Example II, are shown on the accompanying figure. The spectra were obtained by means of a Beckman Quartz Spectrophotometer, following the standard procedure for this instrument. As shown on the graph the absorption spectra of the ethylene-anthracene and cyclohexene-anthracene reaction products are very similar to that of 9,10-dihydroanthracene.

I claim as my invention:

1. A process which comprises thermally, non-catalytically reacting an olefinic hydrocarbon with a polynuclear aromatic compound containing a conjugated diene structure and capable of forming a bridge between the carbon atoms in the 1,4 positions of the diene part of the molecule.

2. A process which comprises thermally, non-catalytically reacting an olefinic hydrocarbon with a polynuclear aromatic compound containing a conjugated diene structure and capable of forming a bridge between the carbon atoms in the 1,4 positions of the diene part of the molecule at a temperature within the range of about 100 to about 300° C.

3. A process which comprises thermally, non-catalytically reacting an olefinic hydrocarbon with a substituted polynuclear aromatic compound containing a conjugated diene structure and capable of forming a bridge between the carbon atoms in the 1,4 positions of the diene part of the molecule at a temperature within the range of about 100 to about 300° C.

4. A process which comprises thermally, non-catalytically reacting an olefinic hydrocarbon with a polynuclear aromatic compound containing three benzene rings and having a conjugated diene structure and capable of forming a bridge between the carbon atoms in the 1,4 positions of the diene part of the molecule.

5. A process which comprises thermally, non-catalytically reacting anthracene with an olefinic hydrocarbon at a temperature within the range of about 100 to about 300° C.

6. A process which comprises thermally, non-catalytically reacting an olefinic hydrocarbon with a polynuclear aromatic compound containing three benzene rings and having a conjugated diene structure and capable of forming a bridge between the carbon atoms in the 1,4 positions of the diene part of the molecule at a temperature within the range of about 100 to about 300° C.

7. A process which comprises thermally, non-catalytically reacting anthracene with an aliphatic olefin at a temperature within the range of about 100 to about 300° C.

8. A process which comprises thermally, non-catalytically reacting anthracene with a mono-olefin at a temperature within the range of about 100 to about 300° C.

9. A process which comprises thermally, non-catalytically reacting anthracene with a cyclic olefin at a temperature within the range of about 100 to about 300° C.

10. A process which comprises thermally, non-catalytically reacting anthracene with an unsaturated hydrocarbon in the presence of an unreactive solvent at a temperature within the range of about 100 to about 300° C.

11. A process which comprises thermally, non-catalytically reacting anthracene with a mono-olefinic hydrocarbon in the presence of a non-polar hydrocarbon solvent at a temperature within the range of about 100 to about 300° C.

12. A process which comprises thermally, non-catalytically reacting anthracene with ethylene at a temperature within the range of about 100 to about 300° C. in the presence of a solvent comprising toluene.

13. A process which comprises thermally, non-catalytically reacting anthracene with cyclohexene at a temperature within the range of about 100 to about 300° C. in the presence of a solvent comprising toluene.

14. The compound 9,10-cyclohexano-9,10-dihydroanthracene.

CHARLES L. THOMAS.

Certificate of Correction

Patent No. 2,406,645 — August 27, 1946

CHARLES L. THOMAS

It is hereby certified that error appears in the printed specification of the above numbered patent requiring correction as follows:

Column 3, lines 33 and 34, for "142° to 153° C." read *142° to 143° C.*; and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*